June 21, 1927. 1,633,208
L. HAUBERT
POWER DELIVERING ATTACHMENT FOR AUTOMOBILE TRUCKS OR TRACTORS
Filed Nov. 14, 1924 2 Sheets-Sheet 1

Leo Haubert
INVENTOR

WITNESSES

BY

ATTORNEY

June 21, 1927. 1,633,208
L. HAUBERT
POWER DELIVERING ATTACHMENT FOR AUTOMOBILE TRUCKS OR TRACTORS
Filed Nov. 14, 1924 2 Sheets-Sheet 2
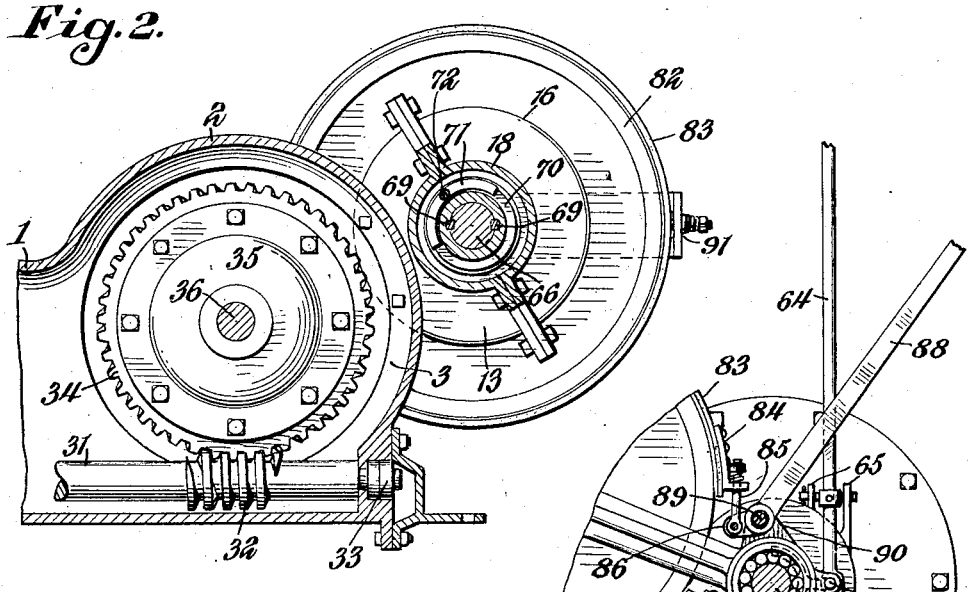
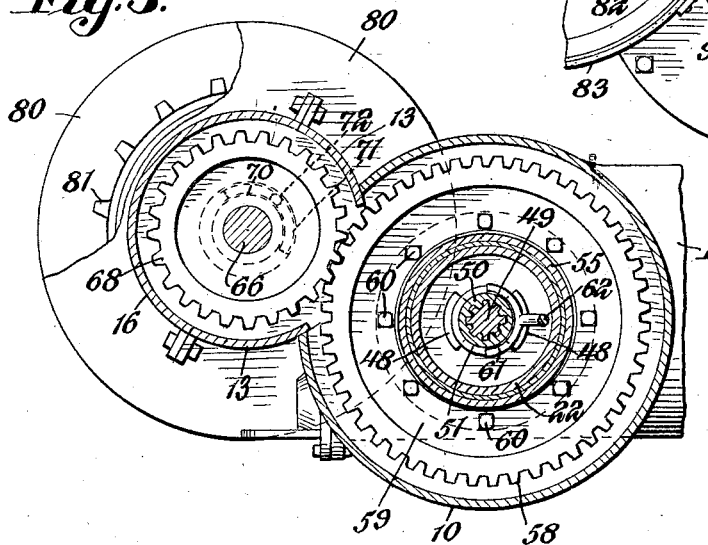
Leo Haubert
INVENTOR Patented June 21, 1927.

1,633,208

UNITED STATES PATENT OFFICE.

LEO HAUBERT, OF TULSA, OKLAHOMA, ASSIGNOR OF ONE-THIRD TO JOHN C. BENNETT AND ONE-THIRD TO JOHN A. WOLFE, BOTH OF TULSA, OKLAHOMA.

POWER-DELIVERING ATTACHMENT FOR AUTOMOBILE TRUCKS OR TRACTORS.

Application filed November 14, 1924. Serial No. 749,915.

This invention relates to improvements in power delivering attachments for automobile trucks and tractors.

The object is to improve and simplify the construction of the device shown and described in Patent Number 1,469,002 issued to me on September 25, 1923, on a power delivering attachment for automobile trucks or tractors and, by the elimination of certain parts therein, and the simplification and rearrangement of other parts, to provide a device which may be more cheaply manufactured, readily assembled and easily operated.

Another object is to provide a device to be readily incorporated into the structure of a truck or tractor without requiring material alteration thereof, the said device or attachment serving to divert the power of the engine or motor of the vehicle, to operate a winding drum to be used in well-drilling operations, or for other heavy lifting by cable, or to be easily and quickly thrown out of gear, when the power is to be directed to the traction wheels of the vehicle for the usual hauling purposes.

A final object is to provide an attachment of this character for use in connection with a truck or tractor which may, if desired, be operated for winding purposes at the same time the tractor is being moved forwardly by its own power, or which may, as stated, be operated when the tractor wheels are stationary, the several controlling means being within easy reach of the driver, in the case of a tractor, while seated on the usual seat thereof.

A full and complete understanding of the invention may be obtained from a consideration of the following detailed description, taken in connection with the accompanying drawing forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 2 is a transverse sectional view taken on the line 2—2 of Figure 1, and looking in the direction of the arrows.

Figure 3 is a similar view taken on the line 3—3 of Figure 1 and looking in the direction of the arrows.

Figure 4 is another transverse sectional view, taken on the line 4—4 of Figure 1 and looking in the direction of the arrows.

Figure 1:
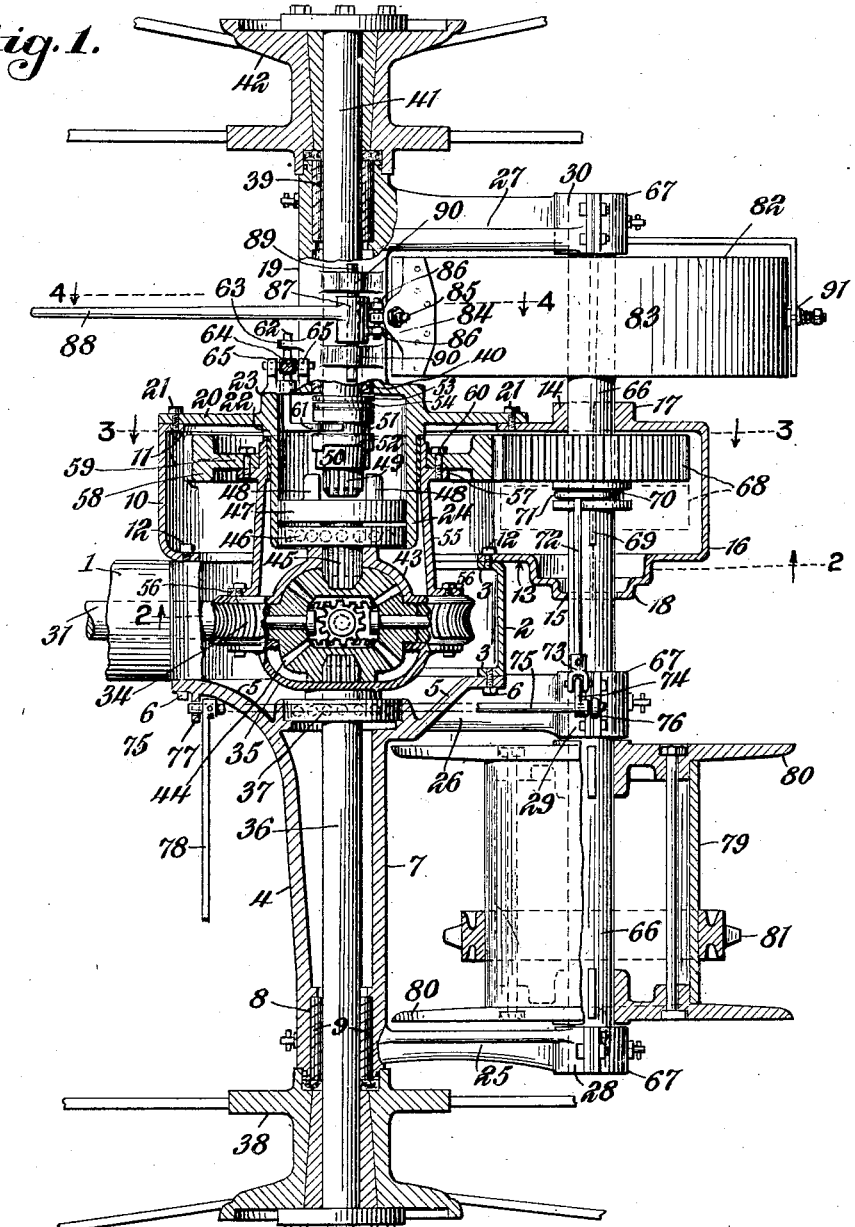
Figure 1 is a horizontal sectional view through the rear axle structure of an ordinary tractor and showing the improvements attached thereto.

The present invention is designed for use in exactly the same manner as that disclosed in the aforesaid Patent No. 1,469,002, wherein is shown a tractor having a divided axle, each axle being composed of two parts, having separate means for connecting or disconnecting the said two parts of each axle, and requiring two operations to arrange the parts for actuation through the power-driven differential to drive the machine forward for pulling or hauling in the usual manner, and a separate and distinct operation for throwing into or out of gear, the drum winding mechanism incorporated therein. The present invention requires only one operation to arrange the parts of the separate axles to apply the power to the traction wheels for moving the vehicle bodily in either direction, a reverse action causing the same to stand still, at either of which times the winding means may be operated for winding in on a cable to lift well-drills, casings, etc., out of wells, and similar hoisting operations, or for the operation of a belt or sprocket chain for running machines of different kinds.

Referring to the drawings there is shown, in Figure 1, the rear portion of a well-known type of tractor, including the tubular casing 1 forming part of the transmission housing and constituting the back bone of the machine, the said casing terminating in an integral, circular ring or housing 2 adapted to surround the differential gearing in the usual manner. The ring 2 is provided with inturned, annular flanges 3 at each side, the said flanges being suitably apertured at regular intervals and preferably formed integrally with the ring.

At one side, preferably the left, the aforesaid ring 2 is adapted to support a hollow, tapered axle housing 4, extending outwardly therefrom and having its inner end flared outwardly, as indicated at 5, and terminating in an attachment flange having suitable spaced apertures for the reception of bolts 6 for the purpose of securing the same to the adjacent flange 3. The rear side of the tapered axle housing 4 is formed straight, as indicated at 7, for the purpose of providing space for the flanges of a winding drum to be later described. The axle housing 4 is provided at its outer end, with a seat 8, for the reception of the usual roller bearings 9 to reduce the friction of the left hand axle of the tractor.

At the right hand side, the ring 2 is adapted to support an additional housing 10 which is circular in form and provided on its outer end with an inturned annular flange 11, while the inner end is also provided with a similar flange, suitably apertured, for the reception of fastening bolts 12 to hold the housing in place on the frame of the machine.

The housing is provided with a rearwardly-extending off-set 13 formed integrally therewith and arranged at an angle to the housing 10, as clearly shown in Figures 2 and 3 of the drawings. At the outer or right hand side, the extension 13 is provided with a semi-circular bearing 14, while the inner, or left hand wall of the extension 13 is extended outwardly and formed into a semi-circular bearing 15. A cap or cover 16 is adapted to be secured to the open end of the extension, the co-acting faces of the two parts being suitably flanged for the reception of bolts in the usual manner, and the cover 16 being provided with complementary bearings 17 and 18 for co-action with the bearings formed in the extension 13.

The right hand axle housing 19 is of tubular form and is provided, at its inner end, with an attaching plate 20 of the same diameter as the diameter of the aforesaid housing 10, the said plate having suitable apertures adjacent to its periphery for the reception of bolts 21, which secure the plate in position to the aforesaid flange 11 to form a removable closure or head for the housing 10.

The head 20 is provided on its inner face with an annular enlargement 22 and on the outer face with a similar enlargement 23, the latter being integrally connected to the aforesaid axle housing 19 on the right hand side of the machine and being of greater diameter than the same. The inner enlargement 22 is reduced throughout the greater portion of its length to provide an inwardly-extending sleeve 24, the inner end being open and the outer end of the bore thereof extending into said outer enlargement 23. All of the parts as hereinbefore described, form the frame or supporting means and housing means for the various active parts of the invention as hereinafter described.

The left hand axle housing 4 is provided, near its outer, free end, with a rearwardly and upwardly extending arm 25, preferably formed integrally therewith, and another, similar arm 26 is joined to the said axle housing where the latter flares out at 5 and is joined to the ring 2. In like manner the axle housing 19 carries a third arm 27 extending in the same direction, the said arms being suitably flanged or ribbed to provide the necessary strength, and having at their free ends, bearing members 28, 29 and 30 respectively, all in alinement transversely of the line of draft of the machine.

Extending through the trunk or back bone 1 of the tractor is the usual drive shaft 31, having near its rear end, a worm 32, the terminal of the shaft being mounted in a bearing 33 formed in the lower portion of the ring or housing 2.

Located directly over the worm and in mesh therewith, is a worm wheel 34 constituting the ring wheel of the differential, and bolted or otherwise secured to said ring wheel, is a differential housing member 35, in the form of a concavo-convex shell provided with a hub, which is revolvably mounted on the inner end of the left hand axle 36, and which is adapted to revolve in an anti-friction bearing 37 suitably mounted in the left hand axle housing 4.

The axle 36 extends beyond the anti-friction bearing 9 carried at the outer end of the housing 4, and is there equipped with the usual traction wheel 38 and a similar anti-friction bearing 39 is provided at the outer end of the other right hand axle housing 19, while an inner anti-friction bearing 40 is provided at the inner end of the housing 19 where the same joins to the wall or face of the enlargement 23 on the closure plate 20.

The right hand axle 41 is mounted to revolve in the bearings 39 and 40, and the inner end of the same extends into the aforesaid sleeve 24 while the outer end thereof extends beyond the outer bearing 39 and is equipped with a traction wheel 42 similar to the wheel 38.

Secured to the right hand side of the ring wheel 34 is a concavo-convex shell or housing 43 which, together with the member 35 form a complete housing for differential gearing, indicated generally by the reference numeral 44, the said gearing, including the ring 34 comprising a well-known type of differential gearing now in common use.

The inner end of the axle 36 is suitably grooved for splining one of the bevelled pinions of the differential gearing, while the opposite or right hand bevelled pinion of the differential is similarly secured to the inner end of a short shaft 45 which freely revolves in and extends through the housing member 43, which latter has an extended hub portion extending outwardly and having a bearing in an anti-friction device 46 similar to the opposite bearing 37 and mounted in the inner, open end of the aforesaid sleeve 24.

The outer or free end of the short shaft 45 is secured to a head or disc 47 having spaced, concentrically mounted and outwardly-extending lugs 48 to constitute the female member of a clutch. The outer face of the head or disc 47 lies adjacent to the inner end of the right hand axle 41, which is suitably grooved, as at 49, to slidably mount a sleeve 50 constituting the male member of said clutch, and adapted to be moved into and out of engagement with the lugs 48. The sleeve 50 is provided with an annular groove 51 near its outer end, and is further provided with a reduced inner end, thus forming a shoulder which has opposite seats 52 to receive the ends of the lugs and transmit power from the short shaft 45 to the right hand axle 41, when the clutch members are connected.

The axle 41 is provided with a circumferential rib 53, and between the latter and the outer end of the slidable collar 50 is interposed a washer 54 to constitute a thrust bearing for said collar, and to retain said axle in place within the housing 19.

Secured to the attaching flange of the right hand differential housing member 43, is an outwardly-extending, tapered collar 55 which has an annular base flange 56 for the purpose of receiving the fastening bolts, which thus cause the said collar to revolve continuously with the aforesaid ring gear 34, which is directly driven by the worm 32 on the drive shaft 31. Adjacent to the outer end of the tapered collar 55 is an outstanding annular flange 57, which is adapted to carry a gear wheel 58, the latter having a reduced web 59 of annular form and suitably apertured for the reception of bolts 60 which cause the gear wheel to rotate at all times with the collar.

A yoke 61 is mounted in the annular groove 51 of the slidable clutch sleeve 50, and said yoke is formed at right angles to a longitudinally-disposed slide rod 62, which passes out through a suitable bearing opening in the end wall of the enlargement 23, the outer end of the said slide rod having a further sliding bearing in an arm 63 formed on the axle housing 19. An operating lever 64, normally extending upright, is intermediately pivoted between ears 65 formed on the enlargement 23, and the lower end of said operating lever 64 is bifurcated (as shown in Figure 4), and is pivotally connected to the slide rod 62 so that, when the upper end of the lever is grasped by the hand of the operator and rocked in the proper direction, transversely of the machine, the said yoke 61 causes a corresponding movement of the clutch member 50 to be connected or disconnected from the member 47.

Mounted in the alined bearings 28, 29 and 30 is a drum shaft 66 extending entirely across the machine and in rear of and above the axles 36 and 41, said shaft being held in the bearings by cap plates 67. Mounted on the drum shaft is a straight faced pinion 68, which is free to slide longitudinally thereon but is caused to turn therewith, within the aforesaid extension 13 and cap or cover 16 by a spline 69. The pinion 68 is provided with a hub having an annular groove 70, in which is mounted a shifting yoke 71 formed at the end of a slide rod 72 arranged above the shaft 66 and extending parallel thereto, through the wall of the extension 13 to a point over the intermediate supporting arm 26, where it is provided with a fork 73 for pivotal engagement with the free end of a swinging crank arm 74, mounted on a rock shaft 75 extending longitudinally of the machine and located over the axle 36 and the drum shaft 66. The rock shaft 75 has its rear end mounted for rotation in an upstanding lug or arm 76 formed on the intermediate cap plate 67, while the front end of said rock shaft is mounted for rotation in a similar arm 77 carried by the front portion of the attaching flange of the left hand axle housing 4. An inclined operating lever 78 is suitably secured to the front portion of the rock shaft by means of which the latter may be rocked to slide the pinion 68, by means of the yoke 71, rod 72 and crank 74, into or out of meshing relation with the aforesaid gear wheel 58, for the purpose of diverting the power to the drum shaft 66 at any time, either when the axles 36 and 41 are being driven or when the same are stationary.

Between the left hand supporting arm 25 and the intermediate arm 26, a drum 79 is mounted on the shaft 66, the same being suitably keyed or splined to rotate therewith, and the said drum has side flanges 80 which reach relatively close to the left hand axle 36, the aforesaid flattened or straight portion 7 forming ample space for the same. Adjacent to the outer flange 80, the drum is equipped with a suitable sprocket wheel 81 which may be utilized, when desired, for driving a chain for transmitting power to different kinds of machines.

The drum shaft further carries a brake drum 82, of substantially the same diameter as the flanges of the winding drum, and suitably keyed to the shaft between the outer or right hand supporting arm 27 and the housing of the gear wheel 58 and pinion 68, and surrounding the major portion of said brake drum is a brake band 83, to one end of which is attached a re-inforcing plate 84 having one end formed at right angles for the reception of an adjustable bolt 85, the free end of which is formed into an eye for pivotal connection between spaced arms 86 carried by a collar 87, the latter forming part of an operating lever 88. The collar 87 is pivotally mounted on a pin 89 mounted in opposite ears 90 which are supported on top of the right axle housing 19. The handle 88 extends upwardly and normally inclines forwardly so as to be readily grasped by the right hand of the operator, whose seat (not shown) is located above the central portion of the drum shaft, and the clutch operating handle or lever 64 is located adjacent to the lever 88 so that it too may be readily grasped by the same hand, while the gear shifting lever 78 is correspondingly located for use by the left hand of the operator, and all of said handles or levers may be easily operated by an operator standing on the ground.

The intermediate portion of the brake band 83 is supported by an arm 91 which does not, however, interfere with the application of said band by the lever 88 for the reason that the supporting means carried by said arm 91 is cushioned, and the opposite, free end of the brake band 83 is connected to a bracket 92, which is, in turn, supported by an arm extending rearwardly from the axle housing 19. (See Figure 4.)

From the foregoing it will be seen that one of the divided, separate axles of the above mentioned patent has been eliminated in the present application. By shifting the upper or handle end of the lever 64 to the right (assuming that the operator is in the driver's seat), the yoke 61 will force the slidable sleeve 50 in between the lugs 48, which will fit into the notches or seats 52 and thus lock the disc 47 to the axle 41, when both axles are coupled to the differential. If the motor be running, the power from the drive shaft 31, through the worm 32, will turn the ring wheel 34 in the desired direction of rotation, either to drive the vehicle forwardly or rearwardly. The spider gears within the housing members 35 and 43 and constituting part of the usual differential gearing, serve in the usual manner to lock the bevelled pinions at the inner ends of the axle 36 and the short shaft 45 respectively, so that direct and equal power is applied to each of the traction wheels and the machine is moved in the desired direction. At this time, if so desired, the drum shaft may also be rotated and the drum caused to wind up a cable, as, for instance, when it becomes necessary for the tractor to pull itself out of the mud, or when otherwise stalled, for as long as the motor is running and the ring wheel is being revolved, the collar 55 and the gear 58 are also revolving and it is only necessary to slide the pinion 68 into mesh with said gear wheel 58, by means of the hand lever 78, to accomplish this purpose.

When it is desired to use the winding drum in handling oil well tools or casings, or in other uses, where it is necessary for the machine to stand stationary, the right hand axle 41 may be disconnected by shifting the hand lever 64 to remove the collar 50 from the lugs 48, when both axles 36 and 41 will cease to revolve, but the gear ring 34 will continue, together with the collar 55, gear 58 and the pinion 68, if in mesh, to drive the drum. At this time the bevelled pinion on the inner end of the axle 36, being stationary, causes the spider gears of the differential to travel about the same, since the spindles of said spider gears are carried by the said ring. As the spider gears thus travel, they are rotated about their individual axes and the rotative movement is imparted on the other side to the bevelled pinion on the inner end of the short shaft 45 and the latter is rotated, at an increased rate of speed, and carrying the clutch member 47—48 therewith, but since the latter is now disconnected from the axle 41, the latter also is free to remain stationary.

It is believed that the numerous advantages of the present invention will be understood and appreciated, and that the same provides a simple, cheaply-manufactured and strong and efficient means for easy attachment to motor vehicles having separate drive axles, especially to tractors, to render the same capable of performing hoisting as well as hauling or pulling.

What is claimed is:

1. In a power delivering attachment for motor vehicles, a pair of separate drive axles, one of said axles being shorter than the other, differential gearing located between the inner ends of the axles, the longer axle being directly connected thereto, a short shaft extending from the differential to the shorter axle, means for connecting or disconnecting the said shaft and axle, a gear ring surrounding and forming part of the differential, means for driving the gear ring, a concentric collar carried by the said ring, said collar extending laterally of the machine to and beyond the inner end of the short axle, a stationary housing carried by the vehicle frame and surrounding the gearing and collar, an inwardly directed sleeve carried by the housing and extending within the collar to provide an external bearing for the outer end of the collar and an internal bearing for the said short shaft, a gear wheel secured to the outer end of the collar, a drum shaft mounted on the vehicle frame and having a drum, and a pinion slidably mounted on the shaft to be moved into or out of meshing engagement with the said gear wheel, to wind the drum either when the differential is connected to or disconnected from the said shorter drive axle.

2. In a power delivering attachment for motor vehicles, a pair of separate drive axles, differential gearing interposed between and directly connected to one of the axles, means for driving the differential, a short shaft connected to and extending from the latter to the other axle, clutch means for connecting the free end of the said shaft to said axle, a housing secured to the vehicle frame, a bearing sleeve carried by the latter to form a bearing for the short shaft and surrounding the clutch means, a revolving collar carried by the differential and having a bearing on the bearing sleeve, a gear wheel secured to the outer end of the revolving collar, a drum shaft having a drum and mounted on the vehicle frame, a pinion splined on the drum shaft within said housing, and means for sliding the pinion into and out of engagement with the gear wheel.

3. In a power delivering attachment for motor vehicles, a pair of separate drive axles, differential gearing mounted in the vehicle frame, a casing surrounding the differential and including a worm ring, a drive shaft having a worm meshing with said ring, a detachable, driving collar secured to the worm ring and extending outwardly at one side thereof, a housing surrounding the collar, a detachable end plate secured to the outer end of the housing and having an inwardly directed sleeve to form a bearing for the collar and having an outwardly directed axle housing surrounding said shorter axle, means mounted within the inwardly directed sleeve for connecting or disconnecting the shorter axle and the differential, a drum shaft arranged parallel to the axles and mounted in the vehicle frame, a gear wheel supported and rotated by the driving collar, a longitudinally-slidable pinion splined on the drum shaft located in rear of and engageable with the said gear wheel, a rock shaft arranged longitudinally of the machine and mounted on the frame thereof, a crank arm carried by the rock shaft in line with the drum shaft, and a pull rod connected to the crank arm and having connection with the pinion to slide the same into and out of engagement with the gear wheel.

4. In a power delivering attachment for automobile trucks or tractors, a pair of separate drive axles, differential gearing located between the axles and mounted in the frame of the vehicle, a continuous axle housing secured to the frame and surrounding one of the axles, the latter being directly connected to the differential, means for rotating the latter including a ring gear, a collar carried by the ring gear and extending out from the latter to surround the inner end of the other axle, clutch members for connecting to or disconnecting the latter from the differential at will to impart motion to both axles, a hand lever for actuating the clutch, a gear wheel mounted on the free end of the collar, a housing surrounding said gear wheel and supported by the frame, said housing having a removable end plate, an inwardly-directed sleeve formed on said plate and extending into and forming a bearing for the collar and to support one of the clutch members, an outwardly-extending axle housing carried by the end plate and surrounding the adjacent axle, a drum shaft traversing the rear end of the housing, and means for connecting the drum shaft with the gear wheel to rotate the drum shaft at will.

5. In a power delivering attachment for motor vehicles, a pair of separate, alined drive axles spaced apart and each mounted in spaced external bearings and each having a traction wheel rigidly secured to the outer end thereof, differential gearing in constant geared connection with the inner end of one of the axles, a short shaft in constant geared connection with the differential to be driven thereby and extending toward the other axle and having a clutch element thereon, a co-acting element shiftable on said other axle to connect the latter to the short shaft, a power shaft in geared connection with the differential to impart motion thereto, a separate drum shaft spaced from and parallel to the axles and having a winding drum thereon, and means for diverting power from the differential to said drum shaft.

In testimony that I claim the foregoing as my own, I have hereto affixed my signature.

LEO HAUBERT.